United States Patent
Brech et al.

(10) Patent No.: US 7,917,792 B2
(45) Date of Patent: Mar. 29, 2011

(54) SYSTEM FOR MODULATING SIGNALS OVER POWER LINES TO UNDERSTAND THE POWER DISTRIBUTION TREE

(75) Inventors: Brad L. Brech, Rochester, MN (US); Thomas M. Brey, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 12/035,480

(22) Filed: Feb. 22, 2008

(65) Prior Publication Data

US 2009/0217073 A1 Aug. 27, 2009

(51) Int. Cl.
*G06F 1/26* (2006.01)
(52) U.S. Cl. .......................................... 713/340; 713/300
(58) Field of Classification Search .................. 713/340, 713/300, 157; 307/43
See application file for complete search history.

(56) References Cited

U.S. PATENT DOCUMENTS

| 7,131,012 B2 | 10/2006 | Egan et al. |
| 7,181,630 B2 * | 2/2007 | Kadoi et al. .................. 713/300 |
| 2004/0177283 A1 * | 9/2004 | Madany et al. ............... 713/300 |

* cited by examiner

*Primary Examiner* — Nitin C Patel
(74) *Attorney, Agent, or Firm* — Cantor Colburn LLP

(57) ABSTRACT

A power distribution system comprises an input power line configured to supply power produced by a power source, one or more power distribution components operatively connected to receive power supplied by the power source, one or more intelligent system resources, and a power management component. Each power distribution component has one or more power outputs for distributing power along a power line connected thereto and is configured to modulate a carrier signal containing identification data along the power line connected to each output. Each system resource is operatively connected to receive power distributed by at least one of the one or more power distribution components. Each system resource is configured to receive and demodulate the carrier signal modulated by each power distribution component from which it receives power, generate a list of each power distribution component from which it receives power, and pass the list to a system bus. The power management component is configured to receive and process each list from the system bus to generate a mapping of the at least power distribution component from which each system resource receives power.

5 Claims, 4 Drawing Sheets

SYSTEM FOR MODULATING SIGNALS OVER POWER LINES TO UNDERSTAND THE POWER DISTRIBUTION TREE

BACKGROUND OF THE INVENTION

1. Field of the Invention

Exemplary embodiments of the present invention relate to power distribution systems, and more particularly, to mapping power line connections within a power distribution system.

2. Description of Background

A data center is a facility for housing mass storage systems and other computer systems, as well as their associated information technology (IT) equipment. A data center typically includes numerous multi-shelf cabinets or racks each holding multiple devices or enclosures such as servers, disk drives, and other computer devices, and can occupy one room of a building, one or more floors, or an entire building. Data centers also generally include redundant or backup power supplies, redundant data communications connections, environmental controls (for example, air conditioning and fire suppression), and special security devices. Because companies are increasingly reliant on information systems for running their operations, IT operations are a crucial aspect of most organizational functions. If a system becomes unavailable, company operations may be impaired or stopped completely. Therefore, strict management of power and cooling for data center operation is an important issue as it becomes necessary to provide a reliable IT infrastructure with minimal disruption.

The power requirements for data centers are facilitated by power distribution systems, which are complex systems in many respects: multiple sources of power, multiple power consuming devices, and multiple power paths to distribute power from one specific power source to a specific power consuming device. Energy-aware computing encompasses efficiency as well as detection of power consumption levels and temperatures that are outside of operating limits and reduction of system capacity and power use to bring these quantities back into compliance. Lower power consumption results in lower heat dissipation, which increases system stability, and less energy use, which saves money and reduces the burden on the environment. For the IT industry, adequately cooling data center equipment (particularly servers) is an issue, both locally within a device chassis, and more globally among racks in data centers.

A power distribution map illustrates, from an IT perspective, how power flows through the physical infrastructure. A challenge in generating such a map of the power distribution components is determining what IT resources (for example, servers, network equipment, data storage products, and other devices) are plugged into what particular power input lines and other power equipment (for example, Power Distribution Units (PDUs) and Uninterruptible Power Supplies (UPSs). Making such a determination becomes increasingly difficult as the number of power devices and IT resources increase and as the system becomes more and more distributed.

Presently, however, there are no solutions to providing a complete end-to-end power distribution map other than those that require a manual tracing of the line cords and recording of the serial numbers from every device. This can not only be extremely time-consuming, it can become increasingly susceptible to errors as a system becomes larger and more complex, and it can be nearly impossible for a large data center with thousands of devices.

SUMMARY OF THE INVENTION

The shortcomings of the prior art can be overcome and additional advantages can be provided through exemplary embodiments of the present invention that are related to a power distribution system that comprises an input power line configured to supply power produced by a power source, one or more power distribution components operatively connected to receive power supplied by the power source, one or more intelligent system resources, and a power management component. Each power distribution component has one or more power outputs for distributing power along a power line connected thereto and is configured to modulate a carrier signal containing identification data along the power line connected to each output. Each system resource is operatively connected to receive power distributed by at least one of the one or more power distribution components. Each system resource is configured to receive and demodulate the carrier signal modulated by each power distribution component from which it receives power, generate a list of each power distribution component from which it receives power, and pass the list to a system bus. The power management component is configured to receive and process each list from the system bus to generate a mapping of the at least power distribution component from which each system resource receives power.

The shortcomings of the prior art can also be overcome and additional advantages can also be provided through exemplary embodiments of the present invention that are related to methods corresponding to the above-summarized module are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of exemplary embodiments of the summarized invention, technically we have achieved a solution that can be implemented to improve power distribution system reliability by determining which system resources are operatively connected to and powered by which power sources and other power equipment in an automated manner. Exemplary embodiments can be implemented to utilize powerline communication technology to establish communication channels to modulate signals over the existing power cables that pass identification information to each downline (or downstream) power device and system resource. Exemplary embodiments can be utilized to protect power distribution systems against connection problems.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Exemplary embodiments of the present invention can be implemented to provide methods and apparatuses that improve power distribution system reliability by determining which system resources are operatively connected to and powered by which power sources and other power equipment in an automated manner. More specifically, exemplary embodiments can be implemented to utilize powerline communication technology to establish communication channels to modulate signals over the existing power cables that pass identification information to each downline (or downstream) power device and system resource. Exemplary embodiments can thus be utilized to protect power distribution systems against connection problems.

Figure 1:
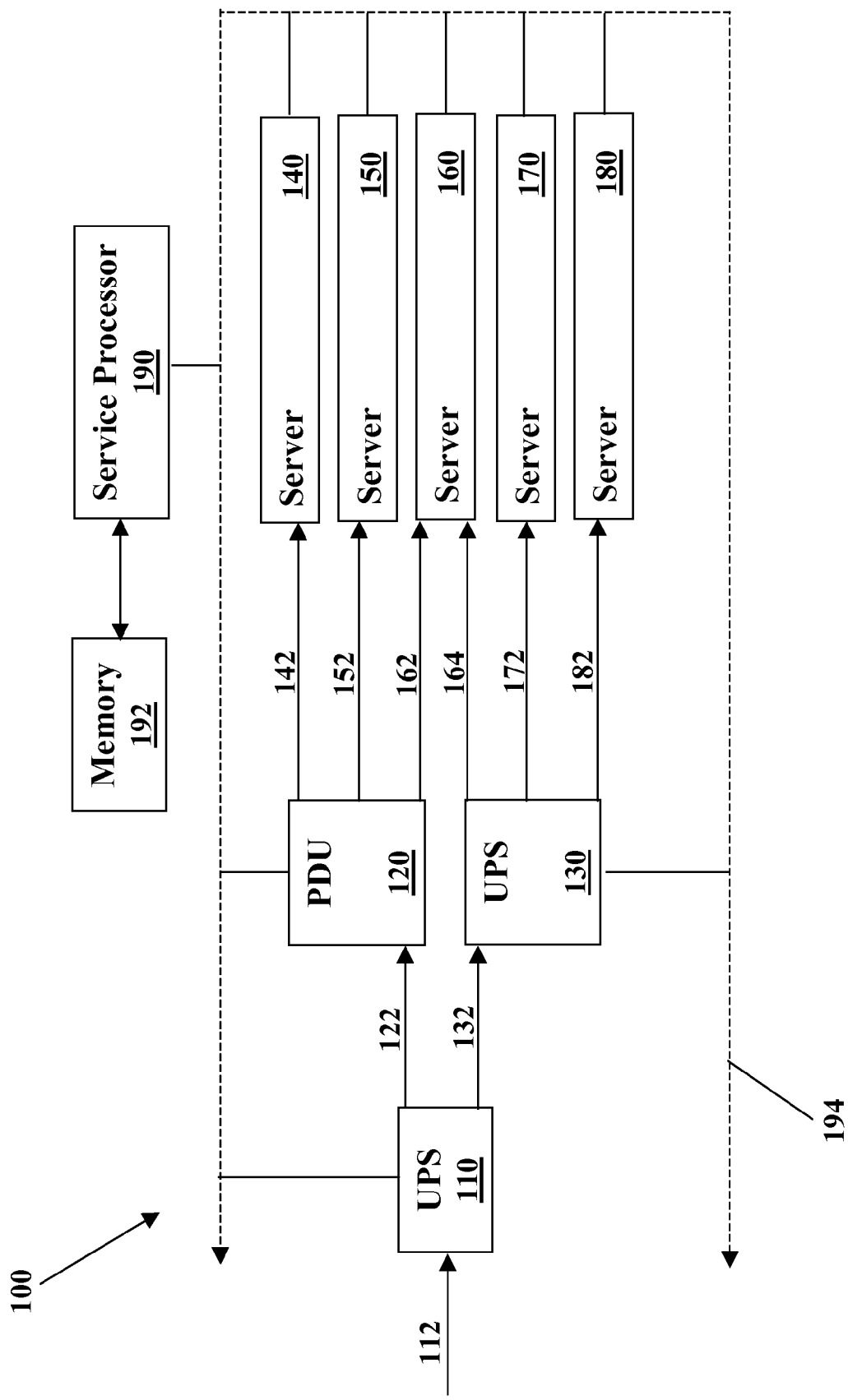
FIG. 1 is a schematic diagram illustrating an exemplary embodiment of a power distribution system.

Referring now to FIG. 1, a schematic depiction of the connections in an exemplary embodiment of power distribution system 100 is illustrated. Exemplary system 100 includes a plurality of servers 140, 150, 160, 170, and 180 powered by a pair of Power Distribution Units (PDUs) 120, 130. Each server handles communications with a plurality of users. PDUs 120, 130 are devices that distribute power supplied by an inlet power source to multiple resources through a plurality of electrical receptacles to which electrical plugs of power cords can be connected. PDUs 120, 130 are powered by an uninterruptible power supply (UPS) 110. UPS 110 can include, for example, a battery system that powers an inverter for supplying continuous operating power to connected equipment of a system or sub-system. System 100 also includes a service processor 190 that controls and monitors the overall operation of the system. Service processor 190 is operated by software that is stored in a memory 192 and implements the power management procedures of the system. Service processor 190 is connected to each power component and system resource of system 100 through a system bus 194. The power management procedures performed by service processor 190 can include, for example, automated meter reading, load shedding, deregulated supplier management, on-site power generation management, power quality management, protection and safety, and general distribution system management, such as equipment inventory and maintenance applications. In exemplary embodiments, service processor can comprise one or more power management components for implementing the management procedures within the system.

In the present exemplary embodiment, UPS 110 receives its power from an AC power line 112 (for example, supplying power from a utility, as illustrated in FIG. 1). PDUs 120 and 130 are connected to UPS 110 through power lines 122 and 132 respectively, and therefore, each PDU is operatively powered by AC power line 112 because the AC power line sources operating power through the UPS to each PDU. Servers 140 and 150 receive input power from PDU 120 through power lines 142 and 152 respectively, server 160 receives redundant input power from PDU 120 through power line 162 and from PDU 130 through power line 164, and servers 170 and 180 receive input power from PDU 130 through power lines 172 and 182 respectively. Therefore, each server is operatively powered by AC power line 112 because the AC power line sources operating power through UPS 110 and PDUs 120, 130.

Figure 2:
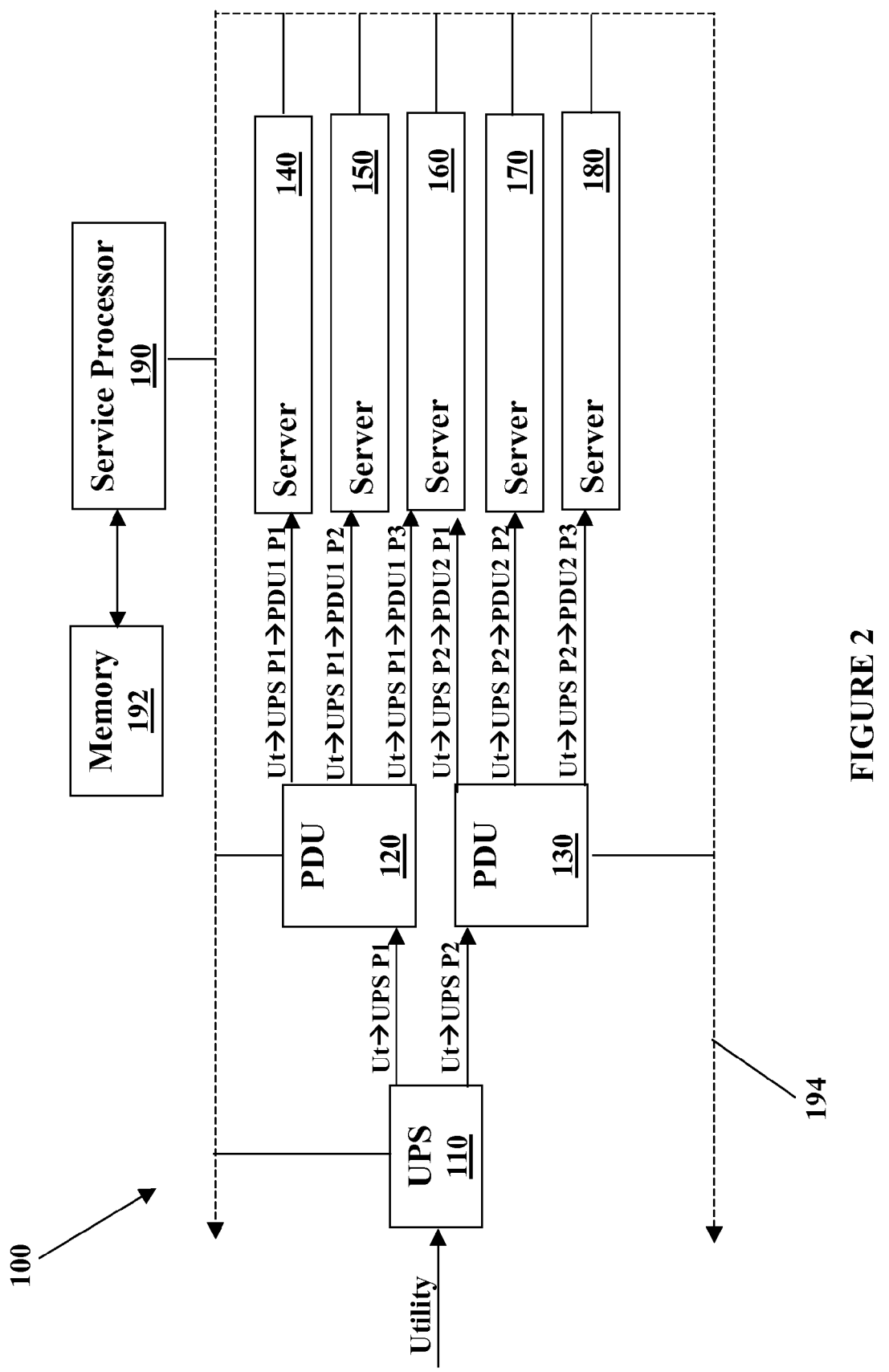
FIG. 2 is a schematic illustrating an implementation of an exemplary embodiment of the present invention within the exemplary power distribution system of FIG. 1.

Referring now to FIG. 2, a schematic depiction of the connections in power distribution system 100 in which an exemplary embodiment of the present invention has been implemented is illustrated. FIG. 2 depicts how the interconnections between power sources, other power equipment, and system resources are identified using communication signals modulated over the existing power cables. More specifically, powerline communication technology is utilized to establish communication channels for each device in system 100 to modulate signals over the existing power cables that pass identification information to each downline power device and system resource. Power line communications systems operate by impressing a modulated carrier signal on the wiring system. Thus, in the exemplary embodiment of FIG. 2, each of power lines 112, 122, 132, 142, 152, 162, 164, 172, and 182 also includes an integrated signal line for transferring identification data in addition to the power line for supplying power, and each power component (that is, UPS 110 and PDUs 130), as well as the utility, is provided with a modulation circuit for transmitting the device identification information on the power lines. In exemplary embodiments, the power line communication can be supplied over any suitable type of suitable electrical cabling media such as, for example, singlemode fiber, multimode fiber, coaxial cable, and UTP and ScTP cabling, and the power line communication can use a frequency band and any modulation method that is appropriate for the signal transmission characteristics of the power wiring used.

In exemplary embodiments, the identification data passed by each power component or system resource can comprise, for example, a discrete IP address or other identifier such as a serial number that can uniquely identify the device and the outlet plug of the device from which the power is being supplied, and the information passed by each device can be compiled to generate a map of power distribution tree for system 100. Each downline device in a path adds its corresponding identification information to the modulated communication signal, and each of servers 140, 150, 160, 170, and 180, which are the last entities in each path (that is, the endpoints), includes a demodulation circuit to recover the identification information strung together by the upline power components. For example, as depicted in FIG. 2, PDU 120 receives a modulated signal along power line 122 indicating that the power is being supplied from the utility and electrical plug 1 of UPS 110, server 150 receives a modulated signal along power line 152 indicating that the power is being supplied from the utility through electrical plug 1 of UPS 110 and then through electrical plug 2 of PDU 120, and server 160 receives a modulated signal along power line 162 indicating that the power is being supplied from the utility through electrical plug 1 of UPS 110 and then through electrical plug 3 of PDU 120 and a modulated signal along power line 164 indicating that the power is being supplied from the utility through electrical plug 2 of UPS 110 and then through electrical plug 1 of PDU 130.

Servers 140, 150, 160, 170, and 180, which comprise the root nodes of the power distribution tree, are intelligent devices that are configured to make use of memory and microprocessors to interpret the identification information strung together in the modulated communication signal and generate a list of the power components from which the power they receive is fed. Each server is also configured to provide this list to service processor 190 over bus 194. Service processor 190, in turn, is configured to process the list received from each server to automatically generate a power distribution tree based on the topology of the power line connections in system 100 mapping of which servers are connected to receive power from which power sources and power equipment.

Figure 3:
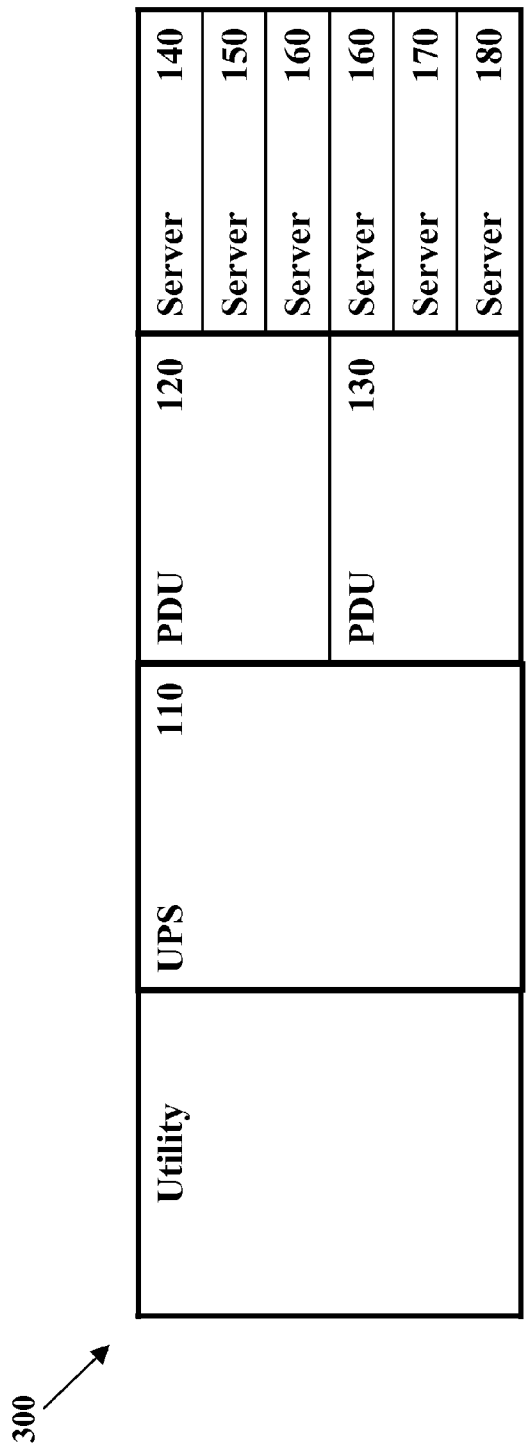
FIG. 3 is a depiction of a data table generated by a power management component the exemplary power distribution system of FIG. 2 in accordance with an exemplary embodiment of the present invention.

In exemplary embodiments, service processor 190 can be configured to generate the power distribution tree showing the topology of power line connections in table form, as depicted in FIG. 3. Data table 300 of FIG. 3 shows servers 140 and 150 as receiving input power from PDU 120, server 160 as receiving input power from both PDU 120 and PDU 130 redundantly, servers 170 and 180 as receiving input power from PDU 130, PDU 120 and PDU 130 as receiving input power from UPS 110, and UPS 110 as receiving input power from the utility. In exemplary embodiments, service processor 190 can be configured to continually monitor the identification information provided from the servers to dynamically update and re-configure the power distribution tree as power line connections are added, disconnected, and otherwise re-wired in the system.

In the present exemplary embodiment, the power distribution tree that is automatically generated by service processor 190 based on the modulated communication signals received by each server can be utilized to ensure that the current connections in power distribution system 100 can be verified at any time for correctness, as well as updated or otherwise managed at any time without requiring intervention by the system operator. For example, if PDU 120 signals a potential failure over bus 194, service processor 190 can reference the power distribution to tree to recognize and the power for servers 140 and 150 is supplied solely from PDU 120 at that level of the tree and switch user communications from servers 140 and 150 to servers 160, 170, and 180, which receive power from PDU 130, before PDU 120 fails. In another example, if UPS 110 signals a potential failure, service processor can reference the power distribution tree to recognize that power for each server is supplied solely from UPS 110 at that level of the tree and perform a controlled shutdown of the server systems before UPS 110 fails. Exemplary embodiments could also be implemented to provide for the measuring and calculating of valuable electrical power monitoring parameters for customers. Such monitoring can be extremely useful in ensuring that power is being effectively and efficiently distributed and utilized. For example, the utility could add the cost of the power being supplied to the modulated identification information. Customers and power management components could then be provided with instant information on billing that could be used to determine the realtime cost savings when system resources are placed on low power or idle modes, thereby enabling more cost-effective control of the system.

While the exemplary system of FIG. 2 includes a single input power source provided by a utility to a single UPS, exemplary embodiments of the present invention can be implemented within power distribution components receiving power from any number of different input sources to generate power distribution trees for any number of sub-systems receiving power supplied from the different power sources. In exemplary embodiments, the input power lines can supply AC power, DC power, or combinations of both. Exemplary embodiments can also be implemented for generating power distribution trees within power distribution systems employing any number and type of UPSs (including larger UPSs that work with generators), PDUs, and other power distribution components, powering any number of system resources, having power distribution components supplying power to any number of multiple power lines, having any number of system resources powered by redundant power supplies (such as server 160 of FIG. 2), and having power distribution tree levels of any depth.

Exemplary embodiments of the present invention can be implemented within very large and complex systems involving numerous sub-systems that are integrated together by complex interconnections, such as those that occur in medical, communication, and financial systems. For example, exemplary embodiments can be implemented within computer systems that process financial data that involve racks hardware and include hundreds of sub-systems each having its own processors and power supplies. Exemplary embodiments of the present invention can be implemented regardless of the presence of line filters.

In the present exemplary embodiment, the endpoints of the power supply connection lines, which appear as the leaf nodes in the power distribution tree, are servers 140, 150, 160, 170, and 180. In alternative exemplary embodiments, the endpoints of the power supply connection lines can be any type of intelligent system resource that incorporates one or more processors and memory to provide for the described functionality. Furthermore, in exemplary embodiments, not all power distribution components in the power distribution system need be configured to modulate their identification information onto their respective output power lines. Rather, the intelligent endpoint systems can be configured to interpret the identification information from the distribution components that are configured modulate such information and pass a partial list to the service processor, which in turn can be configured to generate a partial power distribution tree.

Figure 4:
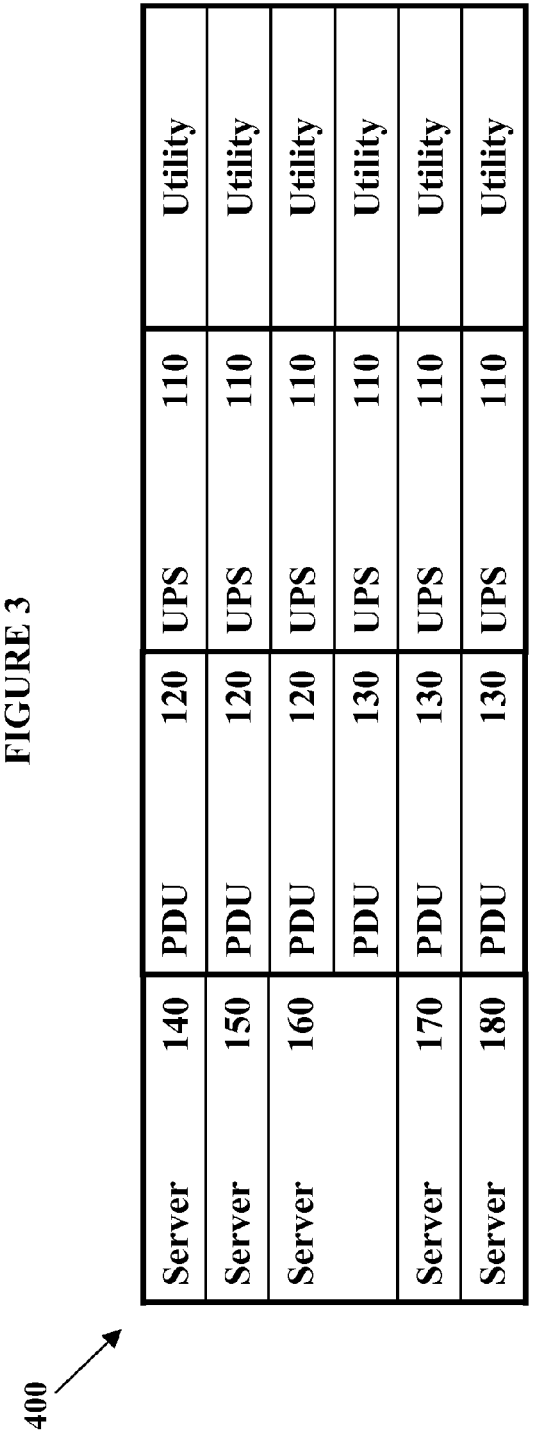
FIG. 4 is a depiction of a data table generated by a utility supplying power to the exemplary power distribution system of FIG. 2 in accordance with an exemplary embodiment of the present invention.

In exemplary embodiments, the list generated by each server of the power components from which the power the server receives is fed could be passed as a feedback signal to the system bus, and the power components can be configured to access the system bus to receive the feedback signal. Each power source can also be configured to receive the feedback signal from the system bus. The feedback communication signals would provide each upline or upstream power component and power source in a power distribution system with identification information for determining and mapping which power components or other system resources it is operatively connected to which to supply power. For example, by implementing this feedback mechanism within exemplary system 100 of FIG. 2, the utility could process the feedback signal to generate the data table illustrated in FIG. 4. Data table 400 of FIG. 4 can be used to determine, for example, that server 140 receives input power from the utility through UPS 110 and PDU 120, that server 160 receives input power from the utility through UPS 110, PDU 120, and 130, and that server 180 receives input power from the utility through UPS 110 and PDU 130.

Figure 5:
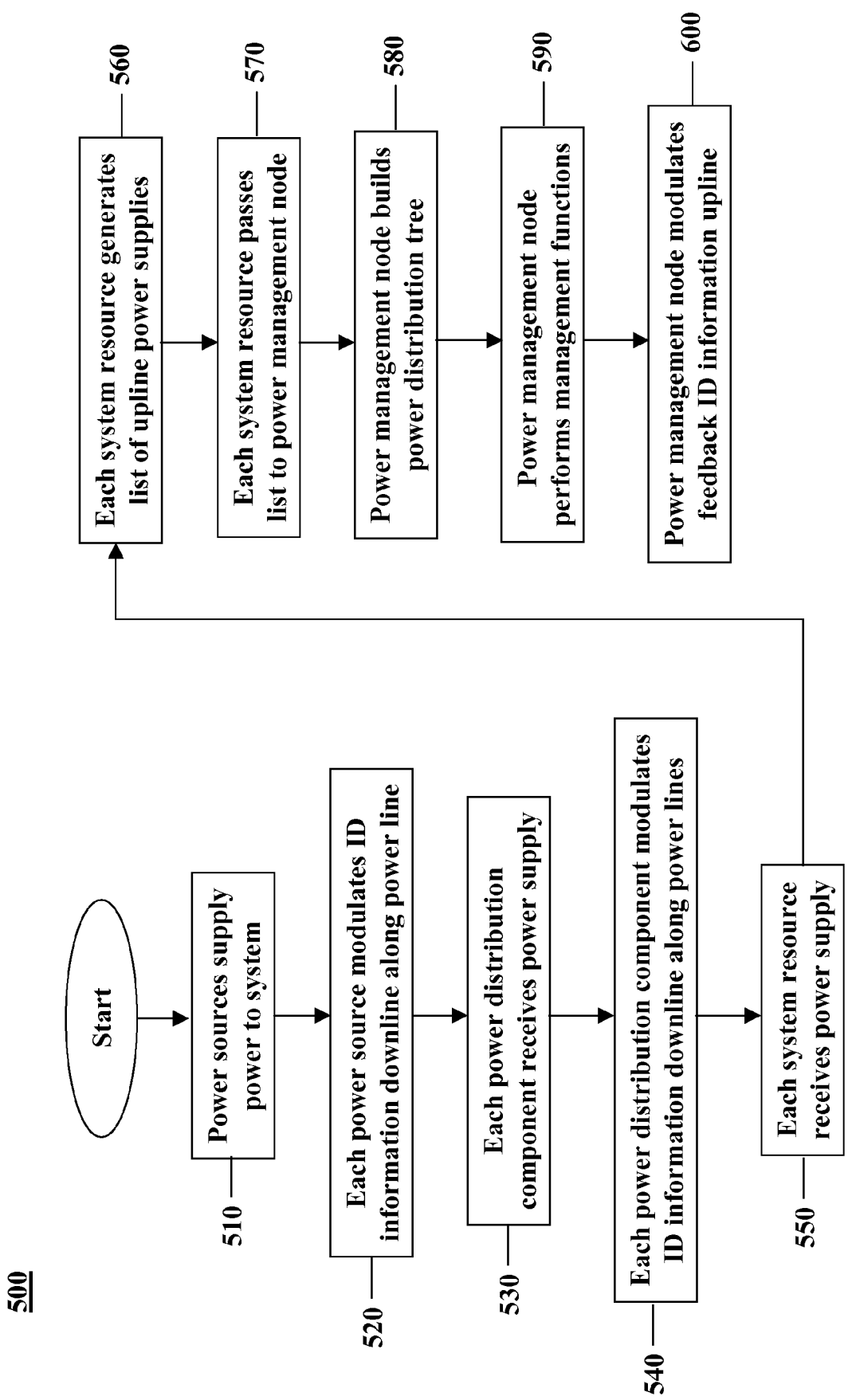
FIG. 5 is a flow chart of a process generating a mapping of the power distribution within a power distribution system in accordance with an exemplary embodiment of present invention.

The operation of a power distribution system within which an exemplary embodiment of the present invention has been implemented will now be described with reference to the process illustrated as a flow chart in FIG. 5. Exemplary process 500 begins at block 510, at which each power source (for example, one or more utilities) to the power distribution system produces and supplies power the system. At block 520, each power source modulates a communication signal carrying identification information along the power line from the power source to the system. At block 530, each power distribution component in the power distribution system receives power from an upline power distribution component or power source. At block 540, each power distribution component modulates its identification information onto the communication signal along the power line from the power distribution component to each downline power distribution component or intelligent system resource to which it is connected. At block 550, each intelligent system resource receives power from the one or more upline power distribution components to which it is connected. At block 560, each system resource demodulates the identification information on the communication signal along the power line from the one or more upline power distribution components to which it is connected to generate a list of the each upline power distribution component(s) and power source to which it is operatively connected for receiving power. At block 570, each system resource passes its list of upline power distribution components to a power management component.

In the present exemplary embodiment, at block 580, the power management component processes the lists received from each system resource to build a power distribution tree representing the power line connections of the system. At block 590, the power management component can perform various power management functions for the system based on the tree representation, such as verifying the connections. At block 600, the power management component modulates feedback communication signals for the lists generated by each system resource of the power distribution components from which the system resource receives power and sends the feedback communication signal for each system resource to the power components from which the system resource receives power in an upline or upstream communication channel.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A power distribution system, comprising:
   an input power line configured to supply power produced by a power source;
   one or more power distribution components operatively connected to receive power supplied by the power source, each power distribution component having one or more power outputs for distributing power along a power line connected thereto, each power distribution component being further configured to modulate a carrier signal containing identification data along the power line connected to each power output;
   one or more intelligent system resources, each system resource being operatively connected to receive power distributed by at least one of the one or more power distribution components, each intelligent system resource being configured to receive and demodulate the carrier signal modulated by each power distribution component from which it receives power, each system resource being further configured to generate a list of each power distribution component from which it receives power and to pass the list to a system bus; and
   a power management component configured to receive each list generated the one or more system resources from the system bus and to process each list to generate a mapping of the at least one power distribution component from which each system resource receives power.

2. The power distribution system of claim 1, wherein the identification data of the carrier signal modulated each power distribution component comprises a first element identifying the power distribution component and a second element identifying the power output of the power distribution component to which the power line along which the carrier signal is modulated is connected.

3. The power distribution system of claim 1, wherein the power management component is configured to continually monitor each list generated by the one or more system resources for modifications and dynamically reconfigure the mapping based upon each modifications.

4. The power distribution system of claim 1, wherein the power source is provided by a public utility, wherein the power source is configured to modulate a carrier signal containing power cost data along the input power line, wherein each intelligent system resource is configured to receive and demodulate the carrier signal modulated by the power source and to pass the power cost data to the system bus, and wherein the power management component configured to receive the power cost data, process the power cost data, perform power management functions based upon the power cost data.

5. The power distribution system of claim 1, wherein the power management component is configured to pass the mapping to the system bus, wherein each power distribution component is configured to receive the mapping from the system bus and determine which of the one or more power components and the one or more system resources it is operatively connected, and wherein the power source is configured to receive the mapping from the system bus.

* * * * *